United States Patent
Ogino et al.

[11] Patent Number: 6,100,792
[45] Date of Patent: *Aug. 8, 2000

[54] CAR SECURITY APPARATUS AND CAR SECURITY SYSTEM

[75] Inventors: Takayuki Ogino; Tsutomu Sato, both of Fukushima, Japan

[73] Assignee: Alpine Electronics, Inc., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/859,418

[22] Filed: May 20, 1997

[30] Foreign Application Priority Data

May 20, 1996 [JP] Japan ................................. 8-148632
Jun. 28, 1996 [JP] Japan ................................. 8-188681

[51] Int. Cl.[7] .................................................... B60R 25/10
[52] U.S. Cl. .......................... 340/426; 340/438; 340/461; 340/539; 340/825.69; 701/34; 701/35
[58] Field of Search ................................ 340/425.5, 426, 340/428, 429, 438, 439, 440, 441, 449, 450, 451, 459, 460, 461, 539, 825.54, 825.69, 825.72; 701/29, 32, 33, 34, 35, 36

[56] References Cited

U.S. PATENT DOCUMENTS

| | | | |
|---|---|---|---|
| 4,287,503 | 9/1981 | Sumida | 340/518 |
| 4,671,111 | 6/1987 | Lemelson | 340/439 |
| 4,794,368 | 12/1988 | Grossheim et al. | 340/527 |
| 4,979,170 | 12/1990 | Gilhousen et al. | 370/321 |
| 4,987,402 | 1/1991 | Nykerk | 340/426 |
| 5,257,190 | 10/1993 | Crane | 701/35 |
| 5,329,273 | 7/1994 | Patton | 340/517 |
| 5,479,148 | 12/1995 | Umemoto | 340/539 |
| 5,491,631 | 2/1996 | Shirane et al. | 340/438 |
| 5,543,776 | 8/1996 | L'Esperance et al. | 340/426 |

FOREIGN PATENT DOCUMENTS

| | | |
|---|---|---|
| 96/03730 | 2/1996 | WIPO . |
| 96/27513 | 9/1996 | WIPO . |

*Primary Examiner*—Daniel J. Wu
*Attorney, Agent, or Firm*—Brinks Hofer Gilson & Lione

[57] ABSTRACT

A car security apparatus and a car security system for protecting a vehicle from car theft and tampering which notifies a user of the details regarding an abnormal condition (i.e., the identity of the sensor or sensors that have detected the abnormal condition, and the time of detection) that takes place during the activation of a security function of the apparatus. When any sensor detects an abnormal condition with the security function in an armed (on) mode, a controller stores in a memory device the identification of the sensor that detects the abnormal condition and the time of detection as security information. In response to a predetermined operation performed the user, the controller reads the security information from the memory device and transmits the security information to another onboard device (audio or audio/visual device) having a display. The device receives and then presents the security message using alphanumeric characters on the display.

19 Claims, 17 Drawing Sheets

| | D | O | O | R | | T | R | I | P | P | E | D | | 1 | 0 | : | 1 | 5 | | A | M | |

| | | | | | D | I | S | A | R | M | | M | O | D | E | | | | | | |

FIG. 18A

| S | E | N | S |   | A | D | J |   | R | A | D | A | R |   | E | X | E | . |   | 0 | 1 |

FIG. 18B

| S | E | N | S |   | A | D | J |   | R | A | D | A | R |   | I | N | T | . |   | 0 | 8 |

FIG. 18C

| S | E | N | S |   | A | D | J |   | I | M | P | A | C | T |   | P | - | W | A | . |   | 0 | 2 |

FIG. 18D

| S | E | N | S |   | A | D | J |   | I | M | P | A | C | T |   | T | R | I | G | . |   | 1 | 0 |

FIG. 18E

| S | E | N | S |   | A | D | J |   | G | L | A | S | S |   | T | R | I | G | . |   | 1 | 2 |

| C | O | D | E | | L | E | A | R | N | I | N | G | | M | O | D | E | | E | N | T | E | R |

| | | | | P | R | E | S | S | | T | X | | B | U | T | T | O | N | | | | |

| | | | | | C | O | D | E | | A | C | C | E | P | T | E | D | | | | | |

CAR SECURITY APPARATUS AND CAR SECURITY SYSTEM

BACKGROUND OF THE INVENTION

1. Field of the Invention

The present invention relates to a car security apparatus and a car security system for discouraging car theft and car tampering.

2. Description of the Related Art

Conventional car security apparatuses are typically provided with sensors for monitoring the opened or closed states of a car door, a bonnet and a trunk, and a sensor for detecting vibrations of the car. When any of these sensors detects an abnormal condition while the car security function of the apparatus is on (armed), a siren is sounded and an engine starter is disabled when an ignition switch is subsequently turned on.

The car security apparatus is typically operated from a remote control unit (hereinafter simply referred to as remote unit) that transmits cordless communication signals via radio waves, infrared rays, or ultrasonic waves. A user turns off (disarms) the security function of the apparatus while driving the car. When the user gets out of and leaves the car, he sends a signal from the remote unit to the car security apparatus to turn on (arm) the security function.

If one of the sensors fails and sends faulty (erroneous) detection signals in the conventional car security apparatus, the user may mistake the resulting alarm for a car tampering event because the user may not know that the sensor is faulty. To address this problem, some security apparatuses alert the user that a sensor is faulty by sounding a buzzer when the sensor fault is detected with the security function turned on. In this case, however, the user is still unable to isolate (locate) the faulty sensor because the buzzer is the same no matter which sensor becomes faulty.

In some conventional security apparatuses, a single remote unit may be used to control a plurality of car security apparatuses mounted in respective vehicles. In these units, the user must manually select a vehicle number on the remote unit corresponding to a selected one of the plurality of vehicles. If the user forgets the vehicle number of the selected vehicle, however, the user is required to repeatedly transmit signals to the cars while changing the selected vehicle number on the remote unit one by one until the car security apparatus in the intended vehicle operates. This is a tedious operation.

When any fault takes place in the conventional car security apparatus in a vehicle in which the security function is on (armed), the occurrence of the fault is evident from the resulting alarm (for example, the sounding a siren). The alarm is typically set such that it stops after a predetermined fixed time period. If the user does not hear the alarm before the fixed time period ends, the user may fail to notice that an abnormal condition has occurred, or the details regarding the abnormal condition (that is, which sensors were triggered at what time, for example).

In some car security apparatuses, the user is notified of a sensor that has detected an abnormal condition by a flashing pattern (time intervals between flashes) of an light-emitting diode. In this case, however, the user may have to consult a manual to identify which sensor was triggered by the abnormal condition from the flashing pattern of the LED, and such a step is inconvenient. In addition, this car security apparatus fails to notify the user of the time at which the sensor detected and thus was triggered by an abnormal condition.

SUMMARY OF THE INVENTION

Accordingly, it is an object of the present invention to provide a car security apparatus and a car security system which help a user easily identify which sensors are faulty when they fail.

It is another object of the present invention to provide a car security apparatus and a car security system, wherein a user can learn on a remote unit a vehicle number set in the car security apparatus.

It is yet another object of the present invention to provide a car security apparatus and a car security system, wherein a user can learn details of an abnormal condition (that is, the identity of the sensor that has detected the abnormal condition and the time of the detection of the abnormal condition) which occurs in the car security apparatus while it is turned on (armed).

To achieve the above objects, the car security apparatus of the present invention comprises at least one sensor for detecting the conditions of a vehicle, sensor monitoring means for monitoring the statuses of the sensors for any fault therein, memory means for storing, as faulty sensor information, the information about a fault in the sensors when the sensor monitoring means detects the fault, and communication means for outwardly transmitting the faulty sensor information stored in the memory means.

The car security system of the present invention comprises a car security apparatus connected to at least one sensor for detecting the conditions of a vehicle, for storing, as faulty sensor information, the information about a fault in the sensors when the fault is detected, and an onboard device with a display capable of presenting a character thereon, such as an onboard audio device, an audio visual device and an onboard car navigation device, connected to the car security apparatus via a cable, wherein the onboard device presents, on the display, the faulty sensor information that is transmitted from the car security apparatus via the cable.

The faulty sensor information may be presented on the display of a two-way remote control unit, which may replace or may work along with the display of the onboard device.

The car security system comprises a car security apparatus comprising at least one sensor for detecting the conditions of a vehicle, sensor monitoring means for monitoring the statuses of the sensors, alarm generator means for generating an alarm when the sensor monitoring means detects an abnormal condition in the vehicle, and memory means for storing a predetermined ID code and a vehicle number, and a remote control unit with a display capable of presenting a character thereon, for transmitting and receiving signals via cordless communication means with the car security apparatus, wherein the car security apparatus transmits the vehicle number to the remote control unit which in turn presents the received vehicle number on the display only when an ID code in the signal received from the remote control unit matches the predetermined ID code stored in the memory means.

In the car security apparatus of the present invention, when the sensor monitoring means detects a fault in a sensor, data identifying the faulty sensor is stored in a memory device as faulty sensor information. The faulty sensor information is transmitted to the onboard device, such as an audio device, an audio visual device or an onboard car navigation device, or to the two-way remote control unit so that the faulty sensor information is presented thereon. The user can easily identify the faulty sensor referring to the faulty sensor information presented on the display.

When the car security apparatus receives a signal from the remote control unit, it checks the ID code in the signal, and then transmits the vehicle number set in the car security apparatus to the remote control unit when the ID code in the signal matches the ID code previously registered in the car security apparatus. Upon receiving the vehicle number, the remote control unit presents it on the display. The user thus can easily correct an erroneous vehicle number if it is selected on the remote control unit.

The car security apparatus of the present invention comprises at least one sensor for detecting the conditions of a vehicle, sensor monitoring means for monitoring the statuses of the sensors, memory means for storing, as security information, the information about the sensor which presents an abnormal condition and the time of detection when the sensor monitoring means detects the abnormal condition and communication means for outwardly transmitting the security information stored in the memory means.

The car security system of the present invention comprises a car security apparatus connected to at least one sensor for detecting the conditions of a vehicle, for storing, as security information, the information about a sensor which has detected an abnormal condition and the time of detection, and an onboard device with a display capable of presenting a character thereon, such as an onboard audio device, an audio visual device and an onboard car navigation device, connected to the car security apparatus via a cable, wherein the onboard device presents, on the display, the security information that is transmitted from the car security apparatus via the cable.

Instead of or along with the above onboard device, a remote control unit may be used. The remote control unit with a display capable of presenting a character thereon performs two-way data communication via cordless communication means with the car security apparatus, wherein the remote control unit presents, on the display, the security information that is transmitted from the car security apparatus via the cordless communication means.

In the car security apparatus of the present invention, when a sensor detects an abnormal condition, the information about the identification of the sensor that has detected the abnormal condition and the time of detection are stored as security information in the memory means. The user performs a predetermined step to outwardly transmit the security information via the communication means. The car security apparatus may be connected to a onboard device with a liquid crystal display, such as an onboard audio device, an audio visual device and an onboard car navigation device so that the liquid crystal display presents the name of the sensor that has detected the abnormal condition and the time of detection using alphanumeric characters. The user can thus easily learn details regarding the abnormal condition.

In the car security apparatus of the present invention, the car security apparatus is connected to the onboard device with a display capable of presenting characters, such as an audio device, an audio visual device and an onboard car navigation device via a cable, for example. The car security apparatus stores the identification of the sensor that has detected the abnormal condition and the time of detection as the security information, and then the security information is transmitted to the audio device, audio visual device, or onboard car navigation device. The audio device, audio device or onboard car navigation device presents the security information on its display. By monitoring the display, the user can easily learn details regarding the abnormal condition occurring in the vehicle.

A remote control unit that performs two-way data communication with the car security apparatus via the cordless communication means may be used to present the security information on its display.

BRIEF DESCRIPTION OF THE DRAWINGS

FIGS. 18A through 18E show exemplary screens in an adjustment mode for sensor ensitivity;

DESCRIPTION OF THE PREFERRED EMBODIMENTS

Figure 1:
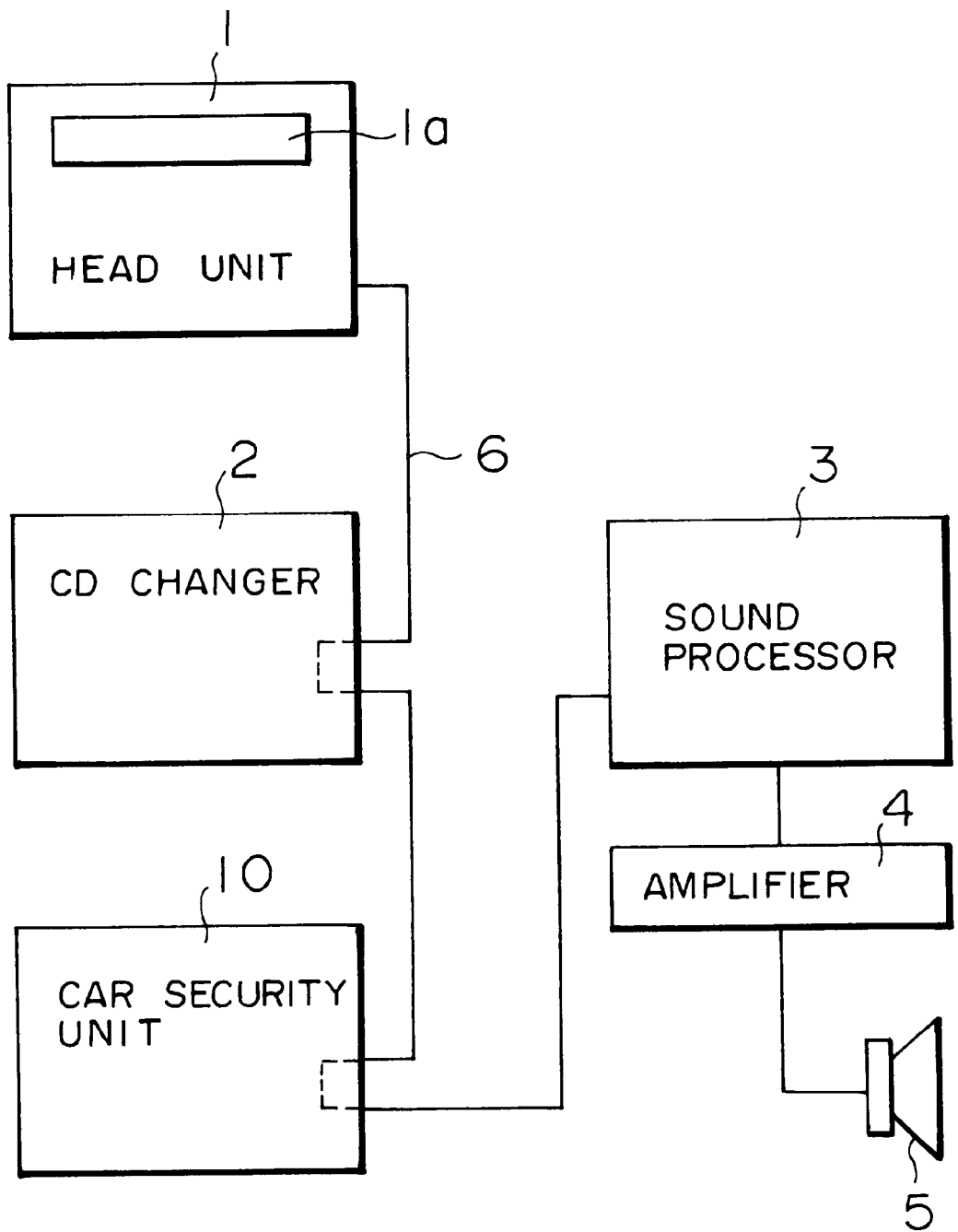
FIG. 1 shows a car security system in accordance with a first embodiment of the present invention.

Referring to the drawings, the embodiments of the present invention are now discussed.

First Embodiment

FIG. 1 shows a car security system in accordance with a first embodiment of the present invention. This car security system comprises in combination a plurality of audio units (in respective audio devices) and a car security unit (in a car security apparatus), all being interconnected by a cable 6.

Referring to FIG. 1, a head unit 1 contains a built-in FM/AM tuner and a built-in cassette player. The head unit 1 is provided with a liquid crystal display 1a capable of displaying a 24-character message, for example, and a variety of operation keys (not shown) for operating the system. A CD changer 2 holds a plurality of CDs (Compact Disks), and is controlled by the operation keys on the head unit 1 to, for example, play a desired CD or a sequence of musical numbers from several CDs. A car security unit 10 is connected to the head unit 1 and CD changer 2, and is discussed in detail below. A sound processor 3 subjects an audio signal transmitted via the cable 6 to a sound effect addition process and equalizing process (sound quality adjustment). An amplifier 4 amplifies the audio signal output from the sound processor 3 and feeds the amplified audio signal to a loudspeaker 5.

Figure 2A:
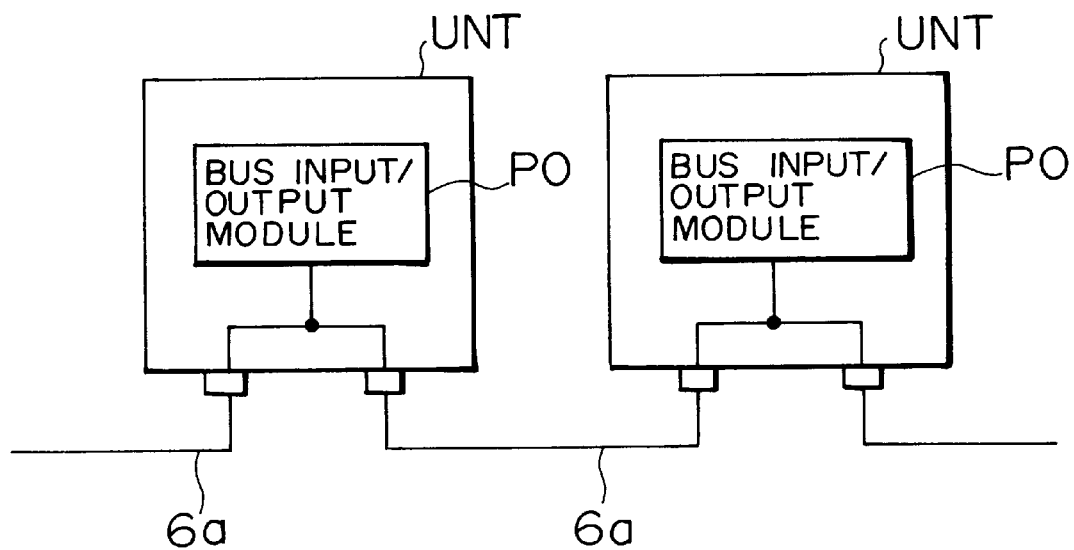
FIGS. 2A and 2B show interconnections between units in the car security system.

The cable 6 interconnects the head unit 1, CD changer 2 and car security unit 10, and includes bus lines (communication lines) for transmitting digital control signals and audio signal lines for transmitting audio signals. As shown in FIG. 2A, a bus line 6a of the cable 6 is routed through each of the units UNT (including the head unit 1, CD changer 2, and car security unit 10), and is connected to a bus input/output module PO in each unit UNT. The units UNT exchange digital control signals with each other through the respective bus input/output modules PO and the bus line 6a.

Figure 2B:
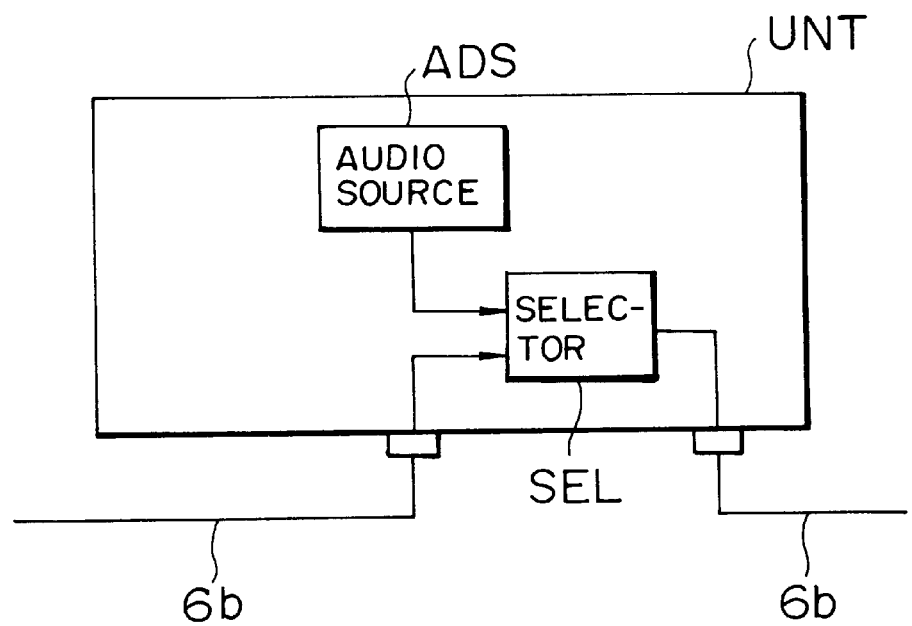

Referring to FIG. 2B, the audio signal line 6b is connected to a selector SEL in each unit UNT. Each selector SEL is controlled either to pass an audio signal received on audio signal line 6b from a preceding unit UNT, or to transmit an audio signal output from an audio source ADS inside the unit UNT housing the selector SEL.

Figure 3:
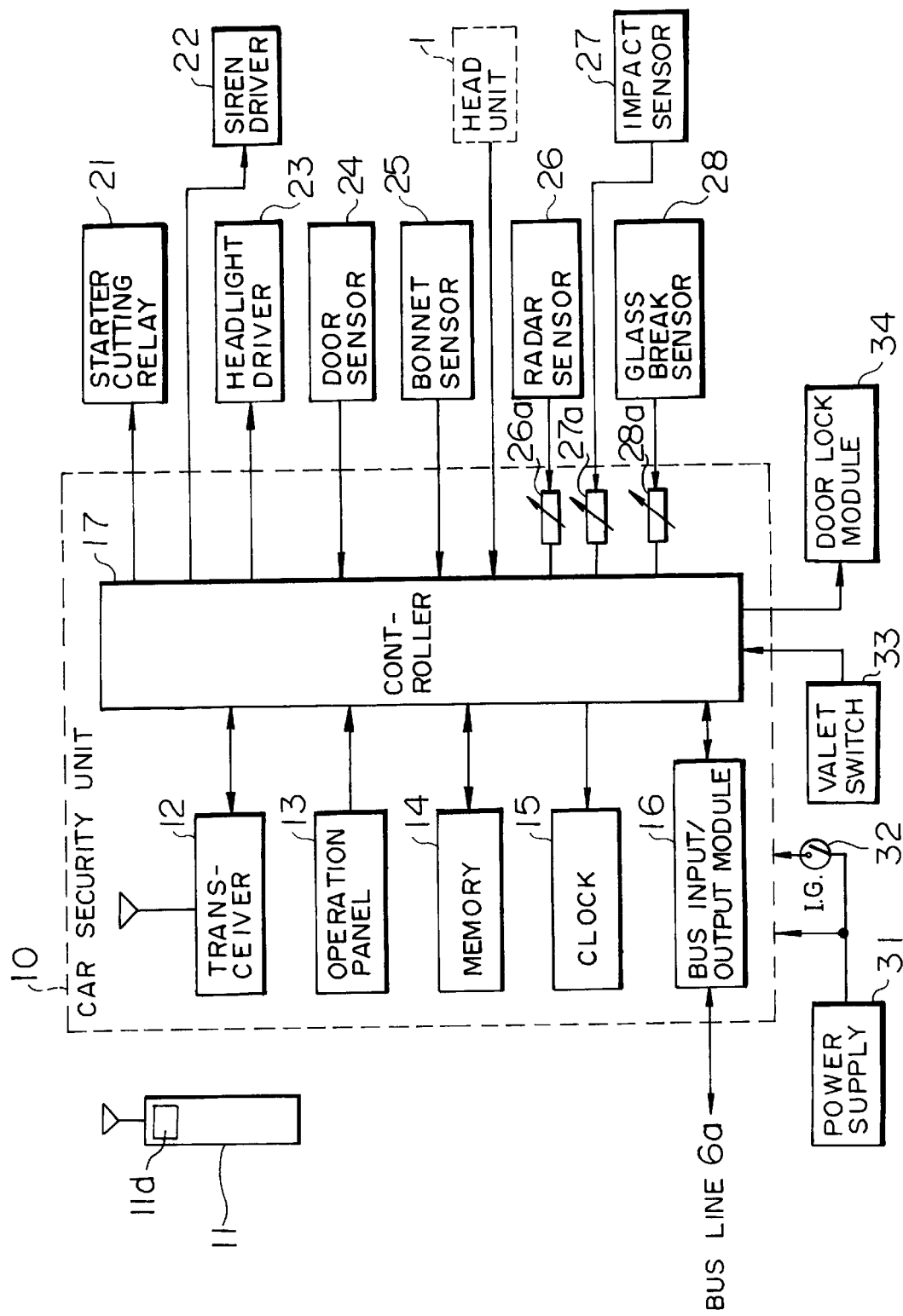
FIG. 3 is a detailed block diagram showing the car security unit.
Figure 4:
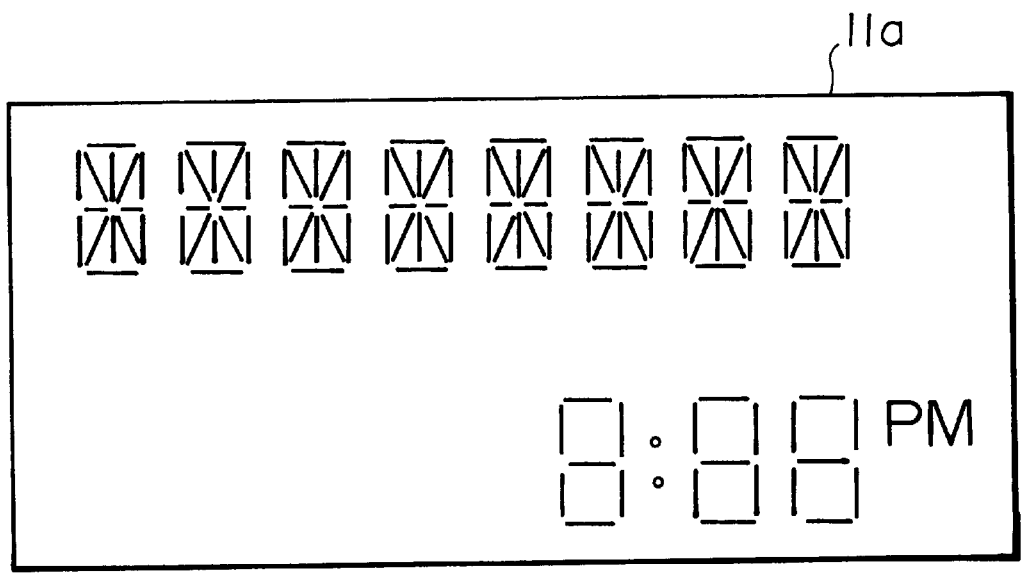
FIG. 4 is a plan view showing a display of a remote unit in the car security system.

FIG. 3 is a detailed block diagram showing the car security unit 10. As shown, a two-way remote unit 11 transmits and receives data using, for example, radio waves or infrared rays. The remote unit 11 is provided with a security on (arm) button, a security off (disarm) button, a car door lock button and a car door unlock button. The remote unit 11 is also provided with a display 11d capable of presenting eight alphanumeric characters and time information. The two-way remote unit 11 further includes a built-in buzzer (not shown).

The two-way remote unit 11 exchanges data with the car security unit 10 using light rays (including a visible light ray or an infrared light ray) or an acoustic wave (an ultrasonic wave).

Also shown in FIG. 3 are a transceiver 12 for transmitting data from and receiving data with the remote unit 11, and an operation panel 13 having a variety of operation keys thereon. A memory device 14 comprises a ROM that stores a program for executing functions required of the security apparatus, a RAM for temporarily storing data, and an EEPROM (Electrically Erasable Programmable ROM) for storing an ID (Identity) code of the remote unit. Also shown are a clock 15 for measuring time, and a bus input/output module 16 connected to the bus line 6a, for outputting data onto the bus line 6a and receiving data from the bus line 6a.

A controller 17 having a microcomputer therein is connected to each of the transceiver 12, operation panel 13, memory device 14, clock 15, and bus input/output module 16. The controller 17 monitors the statuses of several sensors, stores in the memory device 14 the identify of a sensor which detects an abnormal condition along with the time of the detection, and generates a signal that activates an alarm. Sensor sensitivity adjusters 26a, 27a and 28a are respectively connected to a radar sensor 26, an impact sensor 27, and a glass break sensor 28.

A car battery 31 powers the car security unit 10. The car security unit 10 is designed to detect the on/off status of an ignition switch 32.

A valet switch 33 is mounted in a less-conspicuous place, for example, below a dashboard. The valet switch 33 is used to disarm the security unit 10 without using the remote unit 11. A door lock module 34 is locked or unlocked by the controller 17 in response to signals received from the remote unit 11.

Discussed next are alarm devices and sensors connected to the car security unit 10.

A starter cutting relay 21 disables an engine starter (i.e., prevents the engine starter from turning) when the car security unit 10 detects any abnormal condition. When the car security unit 10 detects an abnormal condition, it causes a siren driver 22 to sound a siren (audible alarm) to alert persons in the area. Upon detecting an abnormal condition, the car security unit 10 also drives a head light driver 23 to cause head lights to flash on and off (visible alarm) to alert persons in the area.

Also shown in FIG. 3 are a door sensor 24 for detecting the opening and closing of the doors of the vehicle, and a bonnet sensor 25 for detecting the opening and closing of the bonnet of the vehicle. These sensors are on/off type switches, and the opening and closing of each of the doors and bonnet is determined by the on/off status of these switches.

A radar sensor 26 uses microwaves to detect the motion of the vehicle or objects (persons, for example) approaching the vehicle. An impact sensor 27 detects a shock (sudden vibration) exerted on the vehicle, and a glass break sensor 28 detects a shock exerted on glass windows. These sensors 26, 27 and 28 require adjustment to set their sensitivity levels, and are therefore connected to the controller 17 via the sensor sensitivity adjusters 26a, 27a and 28a, respectively.

In addition to the above-mentioned sensors, a diversity of other sensors may be connected to the car security unit 10. Moreover, the car security unit 10 may be connected to, for example, the head unit 1 via wiring other than the cable 6 so that an alarm is provided when the head unit 1 is disconnected and removed. An attempt to steal the car security unit 10 itself also activates an alarm. More particularly, when the car security unit 10 is disconnected from the car battery 31 with the security function on (armed), the car security unit 10 maintains the security function in the armed state. If the car security unit 10 is subsequently mounted in another vehicle, a siren is sounded to notify persons in the area that the car security unit 10 is a stolen one.

The car security unit 10 features the following modes of operation. Some of these modes are selected by the user by manipulating the remote unit 11 and the keys on the operation panel 13, and some modes are changed depending upon the status of the sensors.

(1) Drive Mode

This mode of operation is active when the vehicle is being driven normally by a user. During the drive mode, the ignition switch 32 is on and the security function is deactivated.

(2) Disarmed Mode

The security function remains deactivated. During a disarmed mode, no alarms are activated even if one or more of the sensors are triggered.

(3) Valet Mode

When the ignition switch 32 is off, a valet mode may be entered to temporarily suspend the security function.

(4) Armed Mode

During an armed mode, the security function is on (armed). An alarm mode listed next is entered if any sensor is triggered during the armed mode.

(5) Alarm Mode

In an alarm mode, the car security unit draws attention to an abnormal condition (i.e., by audible and/or visible alarm).

Figure 6:
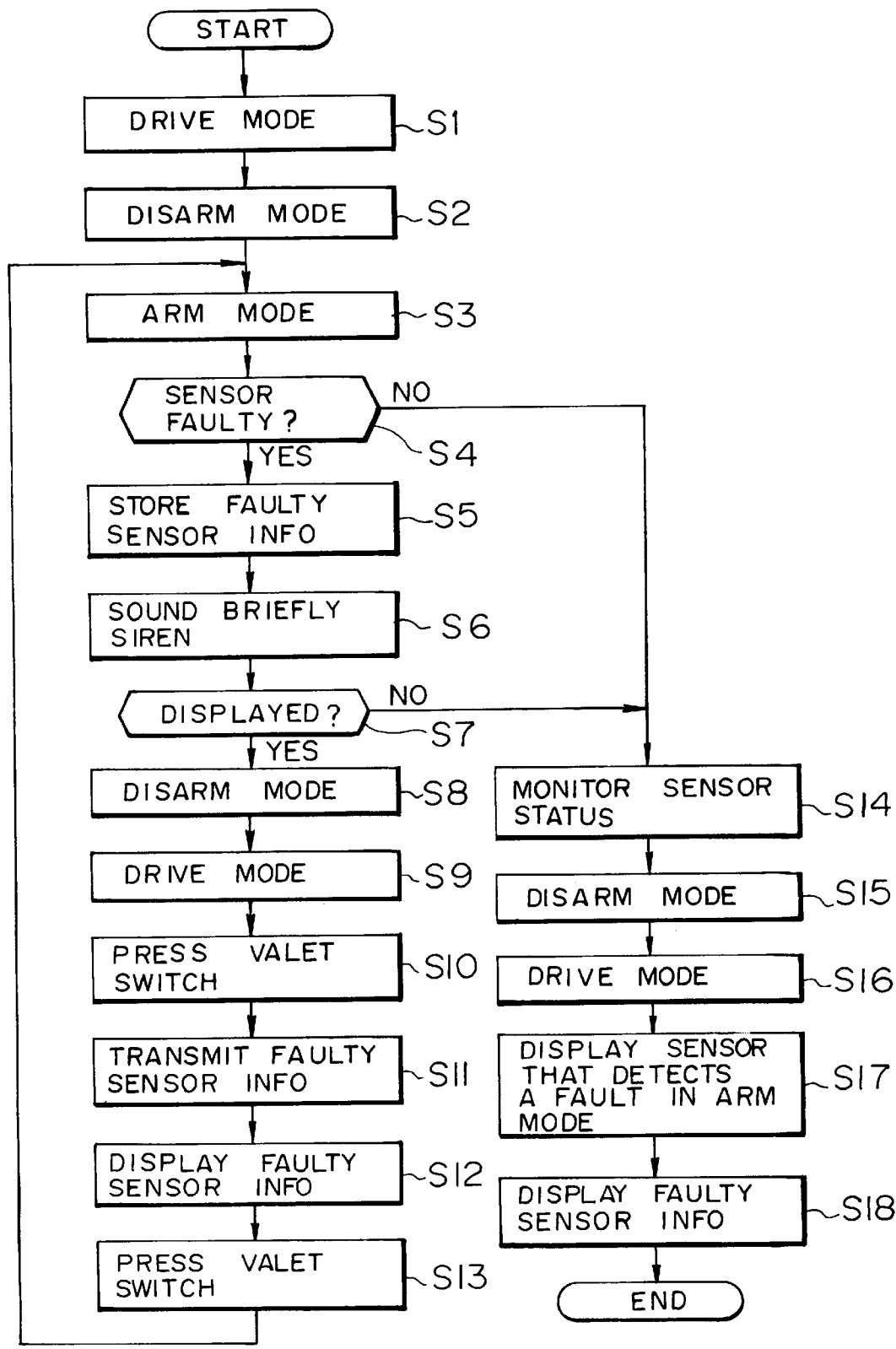
FIG. 6 is a flow diagram showing the operation of the car security system in accordance with the first embodiment of the present invention.
Figure 7A:
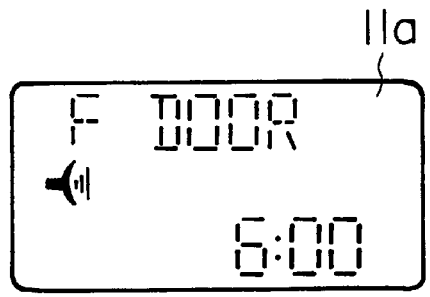
FIGS. 7A through 7E show on-screen information about faulty sensors presented on a display of a remote unit according to a second embodiment of the present invention.
Figure 7B:
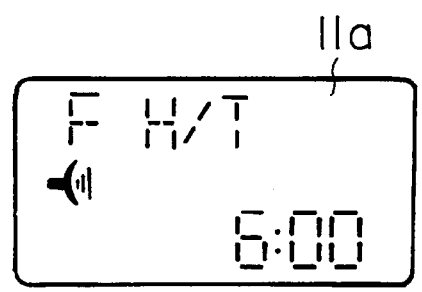
Figure 7C:
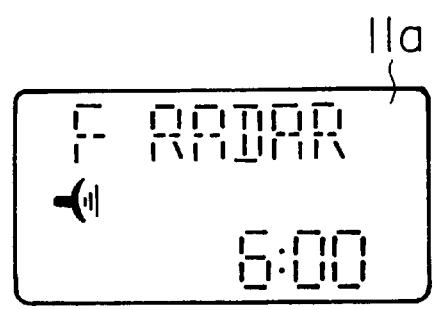
Figure 7D:
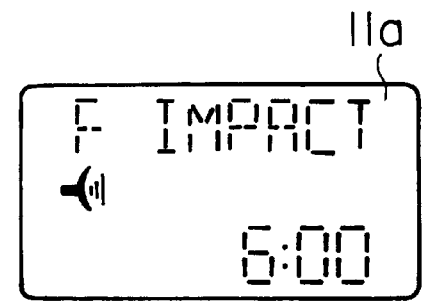
Figure 7E:
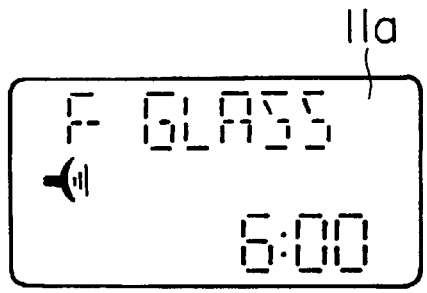

Referring to a flow diagram shown in FIG. 6, the operation of the car security system according to the first embodiment will now be discussed.

When a user drives a vehicle, the car security unit 10 is in the drive mode with the security function off (step S1).

When the user turns the ignition switch 32 off, the car security unit 10 transitions to the disarmed mode (step S2). When the user presses the security on button on the remote unit 11 after getting out of the vehicle and closing the door, the armed mode is entered (step S3).

In the armed mode, the controller 17 in the car security unit 10 checks the sensors. When an abnormal condition is detected (YES in step S4), for example, when the bonnet sensor 25, which is supposed to be on in the armed mode, still remains off even after a predetermined time elapses, the sensor 25 is regarded as being a faulty sensor. Information regarding the presence of the faulty bonnet sensor 25 is stored as faulty sensor information in the memory device 14 (step S5). The controller 17 sounds a siren for a short duration of time to notify the user of the presence of the faulty sensor (step S6).

To identify the faulty sensor (YES in step S7), the user presses the security off button on the remote unit 11 to transition to the disarmed mode, and then turns on the ignition switch to transition to the drive mode (steps S8, S9). The user then presses the valet switch 33 (step S10) after power is supplied to the head unit 1 (i.e., the head unit 1 is turned on). The controller 17 then reads the faulty sensor information from the memory device 14, and transmits this information to the head unit 1 via the bus line 6a (step S11).

Figure 5:
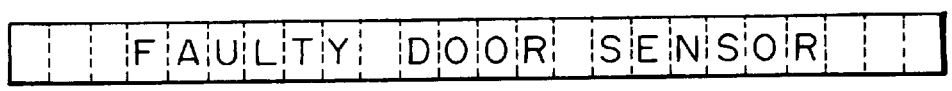
FIG. 5 shows exemplary on-screen information about a faulty sensor on the display.

The head unit 1 presents the fault sensor information received via the bus line 6a on the display 1a (step S12). When a plurality of sensors are faulty, the controller 17 reads additional faulty sensor information (i.e., identifying an additional faulty sensor) from the memory device 14 each time the user presses the valet switch 33, and outputs the additional faulty information to the head unit 1 via the bus line 6a. The head unit 1 presents the faulty sensor information on the display 1a each time it is received. When the user presses the valet switch 33 (step S13) after all faulty sensor information is presented in this way, the presentation of the faulty sensor information ends. FIG. 5 shows exemplary faulty sensor information identifying a faulty door sensor, as displayed on the display 1a.

When the user presses the security on (arm) button of the remote unit 11 after getting out of the vehicle and closing the door, the car security unit 10 returns to step S3, where the armed mode is entered.

In the case of NO at step S4 and at step S7, the car security system passes control to step S14, where the controller 17 monitors the status of each sensor. When any sensor detects an abnormal condition, the controller 17 sounds a siren or flashes head lights on and off to draw attention to the presence of the abnormal condition. The memory device 14 stores the information about the sensor which has detected the abnormal condition and the time of detection.

To release the armed mode, the user presses the security off button of the remote unit 11. The car security unit 10 transitions to the disarmed mode (step S15). Then, the user turns on the ignition switch 32, and the car security unit 10 transitions to the drive mode (step S16). When the user presses the valet switch 33, the controller 17 scans the memory device 14 to read the information regarding the sensor that detected the abnormal condition during the armed mode and the time the sensor was triggered, and then outputs this information to the head unit 1 via the bus line 6a. The head unit 1 presents this information on its display 1a (step S17).

When the user presses the valet switch 33, the controller 17 reads the faulty sensor information from the memory device 14, and transmits the faulty sensor information to the head unit 1 via the bus line 6a. The head unit 1 presents the faulty sensor information using alphanumeric characters on the display 1a. When there is faulty sensor information corresponding to several sensors, the controller 17 transmits the information for one sensor to the head unit 1 each time the user presses the valet switch 33, and the head unit 1 presents the received information on the display 1a (step S18).

The faulty sensor information is continuously stored in the memory device 14 until the car security unit 10 transitions to a subsequent armed mode. While the faulty sensor information is stored in the memory device 14, the user can make the head unit 1 present the faulty sensor information on the display 1a at any time by shifting the car security unit 10 to the disarmed mode and by pressing the valet switch 33.

In the first embodiment of the present invention, as described above, the car security unit 10, when transitioned to the armed mode, determines the presence or absence of a sensor fault by checking the status of each sensor. When any sensor is faulty, the faulty sensor information is stored in the memory device 14. In response to the above-mentioned operation performed by the user, the car security unit 10 feeds the faulty sensor information to the head unit 1 via the bus line 6a and presents it using alphanumeric characters on the display 1a. Thus, the user can easily identify the faulty sensor.

The faulty sensor information in greater detail may be presented if an audio visual (AV) head unit having a cathode-ray tube or a liquid-crystal display (for a television set) is substituted for the head unit 1 having the display 1a with the 24-character screen.

Second Embodiment

A second embodiment of the present invention will now be discussed. The second embodiment is identical to the first embodiment except that the second embodiment displays the faulty sensor information on the display 11a in a remote unit 11. The second embodiment is discussed with reference to FIGS. 1 through 4.

In the second embodiment, when the car security unit 10 is transitioned to the armed mode, the controller 17 in the car security unit 10 checks the status of each sensor. If a sensor gives an abnormal output, the sensor is regarded as a faulty sensor, and identification information about the faulty sensor is stored in the memory device 14 as the faulty sensor information. The controller 17 transmits via the transceiver 12 to the remote unit 11 a signal indicating the presence of a faulty sensor. Upon receiving the signal, the remote unit 11 sounds briefly a built-in buzzer to alert the user to the presence of the faulty sensor.

After transmitting the signal, the controller 17 reads the faulty sensor information from the memory device 14, and transmits the faulty sensor information to the remote unit 11 via the transceiver 12. If there are two or more faulty sensors, the controller 17 reads sequentially each piece (group) of faulty sensor information (each piece identifying one faulty sensor) from the memory device 14, and then transmits it sequentially to the remote unit 11 every five seconds, for example.

Upon receiving the faulty sensor information from the car security unit 10, the remote unit 11 presents the faulty sensor information using alphanumeric characters on the display 11a as shown in FIGS. 7A through 7E. FIGS. 7A through 7E show on-screen indications of a door sensor, a hood/trunk sensor, a radar sensor, an impact sensor, and a glass break sensor, respectively, when they are triggered.

In this embodiment, the faulty sensor information is presented using alphanumeric characters on the display 11a in the remote unit 11. Thus, the user can easily identify the faulty sensor in the same way as in the first embodiment.

Third Embodiment

A third embodiment of the present invention will now be discussed. The third embodiment is different from the first embodiment in that the third embodiment is designed to allow a preset vehicle number to be transmitted to the remote unit 11 when a vehicle number contained in the signal received from the remote unit 11 is different from a vehicle number preset in the car security unit 10. Since the rest of the organization of the third embodiment is identical to that of the first embodiment, the third embodiment is discussed referring again to FIGS. 1 through 3.

Each remote unit 11 has its own unique ID code, and the ID code of each remote unit 11 has to be registered in the car security unit 10 before the car security unit 10 will respond to commands transmitted from the remote unit 11.

Figure 8:
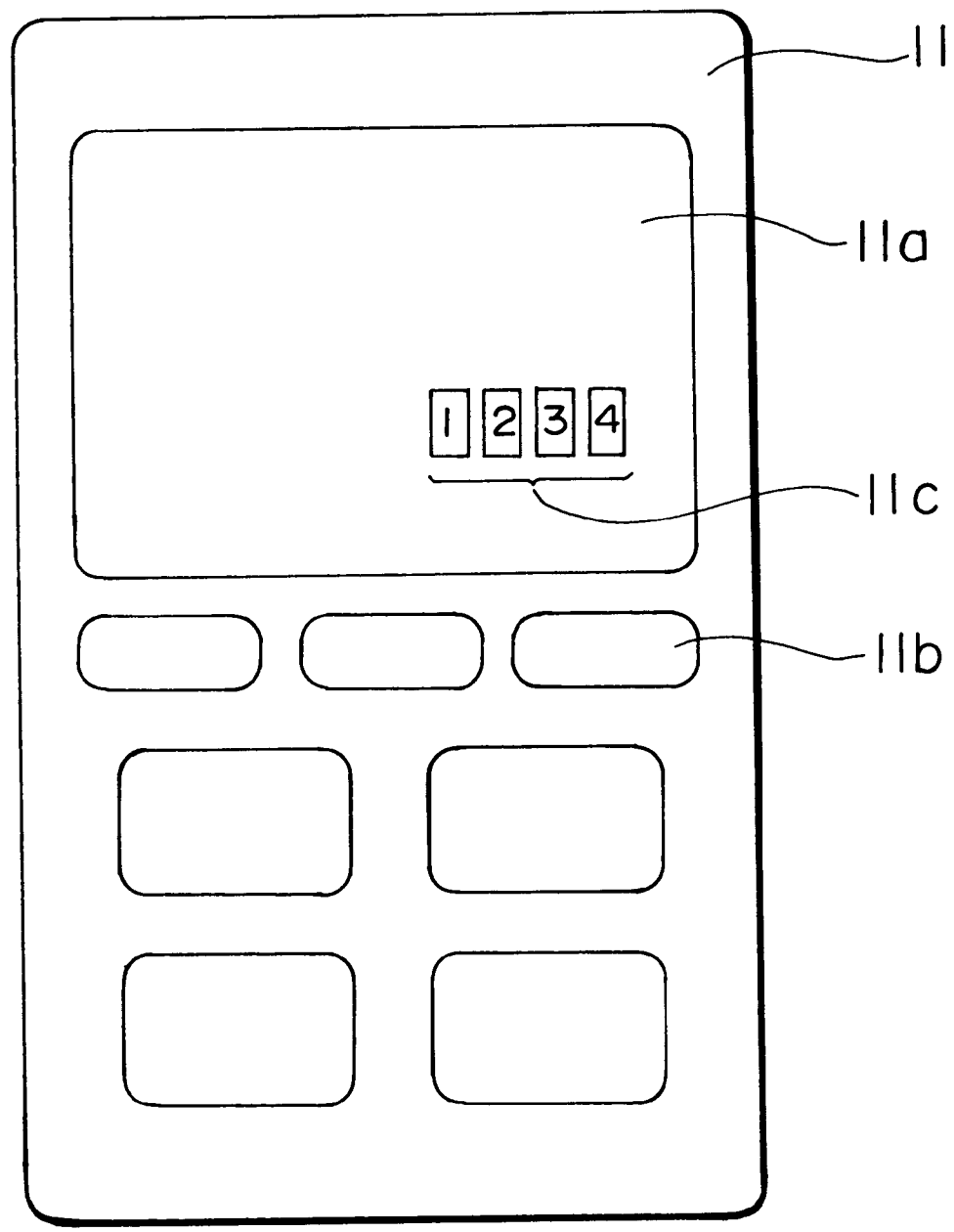
FIG. 8 is a plan view showing a remote unit of a third embodiment of the present invention.

As shown in FIG. 8, the remote unit 11 in the third embodiment has a vehicle number selection button 11b, and has a selected vehicle number display area 11c in the display 11a for presenting vehicle numbers from 1 to 4. Each time the vehicle number selection button 11b is pressed, the selected vehicle number displayed in the selected vehicle number display area 11c changes in sequence. During transmission, the remote unit 11 transmits signals including an ID code and a vehicle number. A single remote unit 11 is designed to operate up to four car security units 10.

The ID code of the remote unit 11 is registered in the car security unit 10 as follows.

When a reset button (not shown) on the car security unit 10 is pressed with the ignition switch 32 on and the car security unit 10 in the drive mode, the car security unit 10 transitions to an ID code registration mode. If the security on button on the remote unit 11 is pressed for a predetermined time period (five seconds, for example) following the transition to the ID code registration mode, the car security unit 10 extracts the ID code from the signal transmitted from the remote unit 11, and the ID code is then stored in the EEPROM in the memory device 14. Then with the valet switch 33 pressed, the car security unit 10 transitions from the ID code registration mode to the drive mode.

The vehicle number, from 1 to 4, is set using DIP switches (not shown) mounted in the car security unit 10.

Figure 9A:
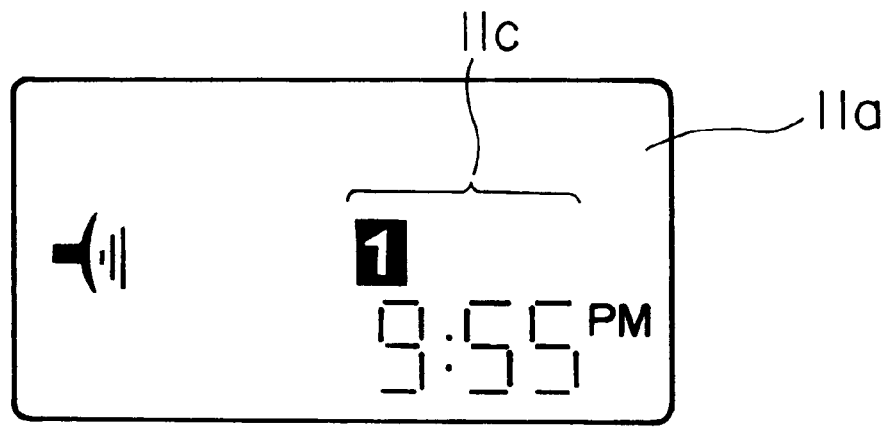
FIGS. 9A and 9B show exemplary on-screen vehicle numbers presented on the display of the remote unit.
Figure 9B:
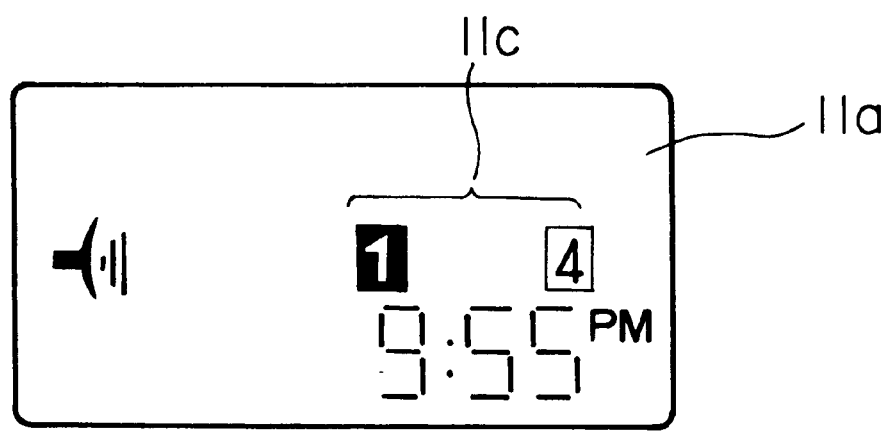

Once both the ID code and the vehicle number are set in this way in the car security unit 10, the user may select a desired vehicle number by pressing the vehicle number selection button 11b on the remote unit 11 to transmit signals from the remote unit 11 to the car security unit 10. The remote unit 11 presents in reverse video font the selected vehicle number ("1" in FIGS. 9A and 9B) on the selected vehicle number display area 11c in the display 11a, as shown in FIG. 9A.

When the security on button on the remote unit 11 is pressed with the vehicle number selected, the remote unit 11 transmits signals with both the ID code and the vehicle number attached thereto to the car security unit 10.

The car security unit 10 checks the ID code and the vehicle number attached to the signals received, and disregards the signals received if the ID code fails to match the one stored in the memory device 14. When the ID code and the vehicle number received match the counterparts stored, the car security unit 10 follows the operation specified by the received signals.

When the ID code attached to the signal received from the remote unit 11 matches the ID code stored in the memory device 14, but with the vehicle number different from the vehicle number stored in the memory device 14, the controller 17 transmits the vehicle number set in the car security unit 10 to the remote unit 11 via the transceiver 12.

Upon receiving the vehicle number from the car security unit 10, the remote unit 11 sounds the built-in buzzer briefly and presents in a box the received vehicle number ("4" in FIG. 9B), received from the car security unit 10, on the vehicle number display area 11c in the display 11a.

The third embodiment also presents the same advantage as the first embodiment. Furthermore, according to the third embodiment, when the ID code received from the remote unit 11 matches the ID code stored in the memory device 14, but with the received vehicle number being different from the set vehicle number, the car security unit 10 transmits the set vehicle number to the remote unit 11. The remote unit 11 receives and then presents the set vehicle number on the display 11a. Even if the user enters an erroneous vehicle number on the remote unit 11, the user can easily correct the vehicle number based on the displayed correct vehicle number.

Fourth Embodiment

The operation of the car security system of a fourth embodiment of the present invention will now be discussed referring to a flow diagram shown in FIG. 10. The fourth embodiment is identical to the first embodiment except that the fourth embodiment presents the identification of a sensor that has detected an abnormal condition and the time the sensor was triggered by the abnormal condition. The fourth embodiment is therefore also discussed with reference to FIGS. 1 through 3.

Figure 10:
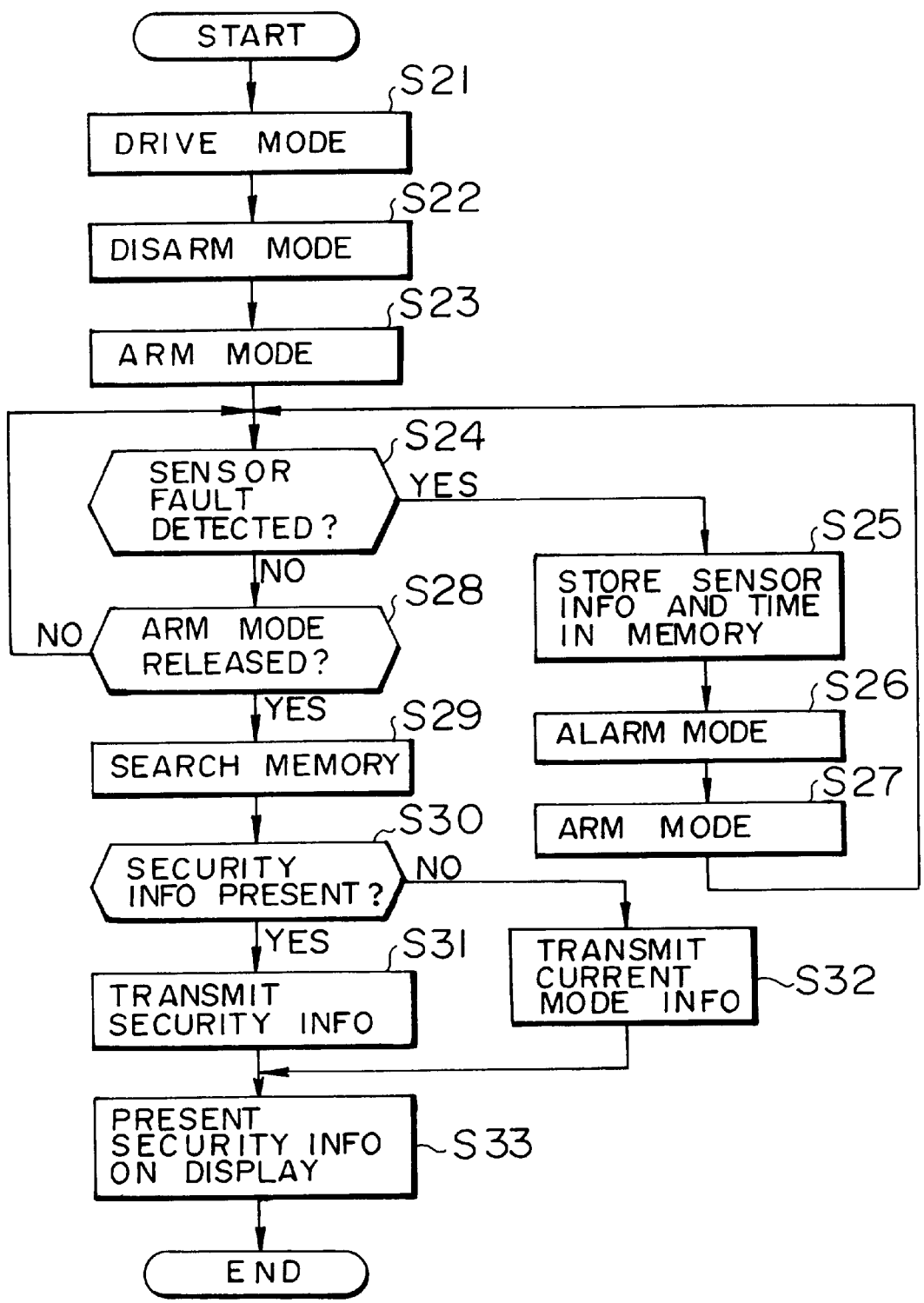
FIG. 10 is a flow diagram showing the operation of a security system of a fourth embodiment of the present invention.

Referring to FIG. 10, in accordance with the fourth embodiment, the car security unit 10 is in the drive mode with the security function off (step S21) while the vehicle is being driven by the user.

When the user turns the ignition switch 32 off, the car security unit 10 transitions to the disarmed mode (step S22). When the user presses the security on (arm) button on the remote unit 11 after getting out of the vehicle and closing the door, the car security unit 10 enters the armed mode (step S23).

The controller 17 in the car security unit 10 then checks the sensors. When one of the sensors, for example, a door sensor detects an abnormal condition (YES in step S24), the memory device 14 stores information identifying the door sensor that has detected the abnormal condition and the time of detection (input from the clock 15) as security information (step S25). After a predetermined period of time elapses, the alarm mode is entered, activating an alarm such as a siren (step S26). After the alarm has been continuously activated for a predetermined time period, the alarm is stopped, and the armed mode is entered (step S27), and the car security unit 10 returns to step S24.

When the sensors detect no abnormal conditions at step S24 (NO), the car security unit 10 passes control to step S28, where it is determined whether the armed mode is released. If the armed mode is not released, the car security unit 10 returns to step S24, where the sensors are monitored.

When the user subsequently opens the door in the armed mode, turns on the ignition switch within a predetermined time period, and turns on the valet switch 33, the car security unit 10 enters the valet mode without activating an alarm. In this case, if the user turns off the ignition switch and opens and closes the door, the car security unit 10 re-enters the armed mode after a predetermined time period.

To release the armed mode, the user presses the security off button on the remote unit 11. In response, the car security unit 10 passes control to step S29 (from step S28). Then, when the user turns on the ignition switch 32, the controller 17 in the car security unit 10 searches the memory device 14 (step S29). When the memory device 14 includes security information written at step S25 (YES at step S30), the car security unit 10 passes control to step S31, where the controller 17 transmits the security information written in the memory device 14 to the head unit 1 via the bus input/output module 16 on bus line 6a.

Figures 11, 12, 13:
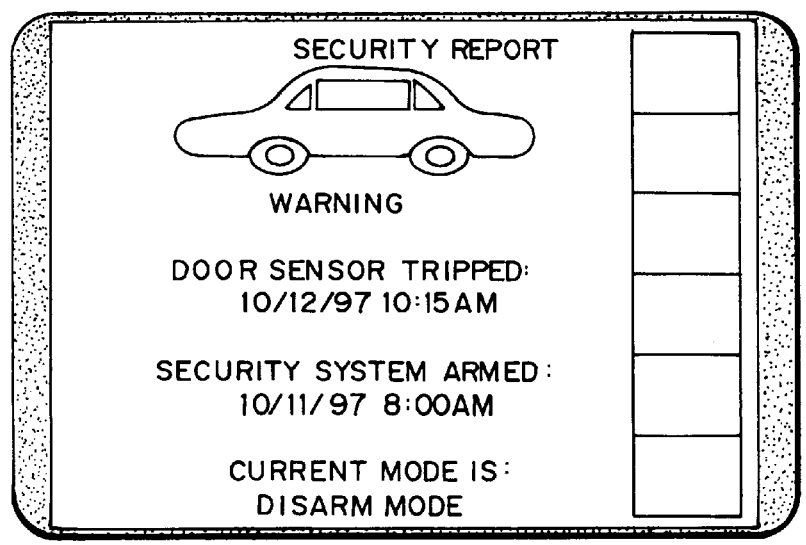
FIG. 11 shows exemplary on-screen security information presented on the display.
FIG. 12 shows an exemplary on-screen indication of a mode of operation for the car security unit.
FIG. 13 shows exemplary on-screen security information presented on a television monitor display.

Upon receiving the security information via the bus line 6a, the head unit 1 presents the identification of the sensor that has detected an abnormal condition and the time of detection on its display 1a for a predetermined period of time (60 seconds, for example) (step S33). When a plurality of sensors have detected abnormal conditions, the head unit 1 displays the identification of each sensor and its detection time, one after the other, each for a predetermined period of time. FIG. 11 shows exemplary on-screen security information presented on the display 1a. For example, the display 1a indicates that the door sensor was tripped at 10:15 a.m., as shown.

When it is determined at step S30 that no security information is stored in the memory device 14, the car security system passes control to step S32, where information indicative of the current security mode is transmitted to the head unit 1 via the bus line 6a. Upon receiving the information, the head unit 1 presents the mode of operation in the car security unit 10 on its display 1a (step S33). FIG. 12 shows an exemplary on-screen indication.

In the fourth embodiment of the car security system, the memory device 14 stores the information of a triggered sensor and the time of detection as security information. When the user releases the armed mode and turns on the ignition switch 32, the head unit 1 presents the security information using alphanumeric characters on the display 1a, and thus the user can easily and in detail learn about the abnormal condition that has occurred in the vehicle.

In the description of the fourth embodiment, the security information is presented on the display 1a of a 24-character screen. Alternatively, the car security unit 10 may be connected to an audio visual system equipped with a television monitor display or a navigation system equipped with a navigation display to present the security information thereon. Such an arrangement may present a large amount of information on one screen at a time, helping the user absorb the information easily.

Fifth Embodiment

Figure 14:
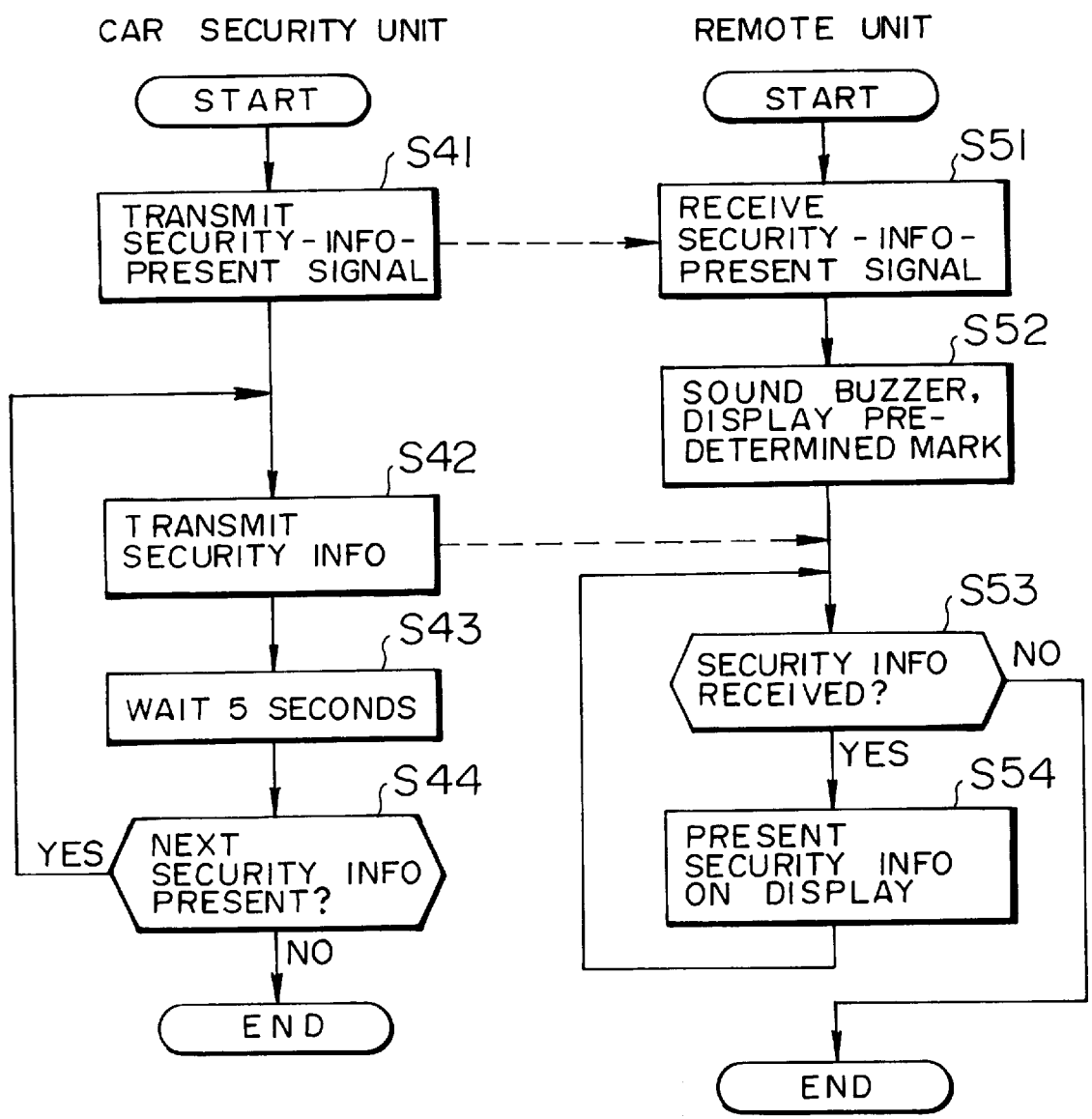
FIG. 14 is a flow diagram showing the operation of a car security system of a fifth embodiment of the present invention.
Figure 15A:
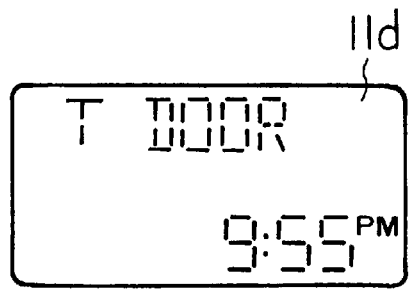
FIGS. 15 through 15E show exemplary on-screen security information presented on the display of the remote unit.
Figure 15B:
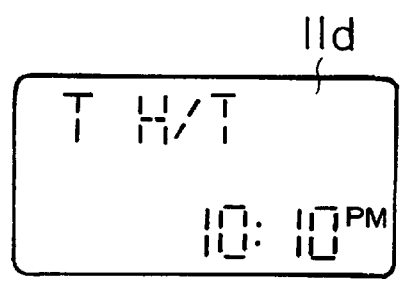
Figure 15C:
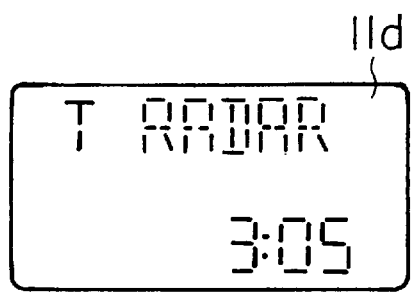
Figure 15D:
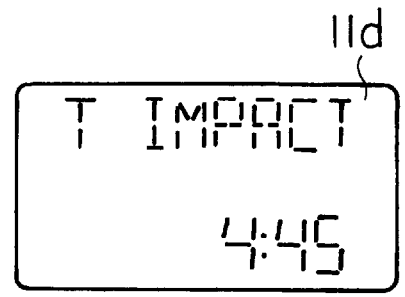
Figure 15E:
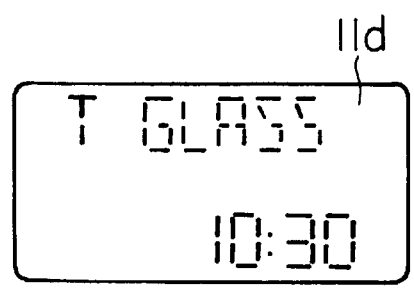

FIG. 14 is a flow diagram showing the operation of a car security system according to a fifth embodiment of the present invention. The fifth embodiment is identical to the fourth embodiment except that the fifth embodiment allows the security information to be presented on a display 11d of a two-way remote unit 11. The fifth embodiment will now be discussed referring also to FIGS. 1 through 3.

In the same way as in the fourth embodiment, the car security unit 10 monitors the sensors in the armed mode, and stores, in the memory device 14, information identifying a sensor that has detected an abnormal condition during the armed mode and the time of detection. When the user releases the armed mode using the remote unit 11, the car security unit 10 searches the memory device 14. The car security unit 10 starts the operation shown in FIG. 14 if security information is stored in the memory device 14.

The car security unit 10 transmits a "security information-present" signal to the remote unit 11 via the transceiver 12 (step S41). Upon receiving the signal (step S51), the remote unit 11 alerts the user to the occurrence of an abnormal condition by sounding the built-in buzzer and presenting a predetermined mark on the display 11d (step S52). The remote unit 11 then passes control to step S53, where the remote unit 11 waits for the arrival of the security information.

The car security unit 10 passes control to step S42 after transmitting the security-information-present signal at step S41, and reads a first piece of security information out of a plurality of pieces (groups) of security information (each group identifying one sensor and the time that the sensor detected an abnormal event) stored in the memory device 14, and transmits the first piece of security information to the remote unit 11 via the transceiver 12. Then the car security unit 10 passes control to step S43.

When the remote unit 11 receives the security information within a predetermined time period at step S53, the remote unit 11 passes control to step S54, where the remote unit 11 presents the security information on the display 11d. Presented as the security information on the display 11d in the remote unit 11 are the identification of the sensor that has detected an abnormal condition and the time of detection.

The car security unit 10 waits 5 seconds at step S43, and then passes control to step S44, where it determines whether the memory device 14 contains security information. If it is determined that additional pieces (groups) of security information are stored, the car security unit 10 returns to step S42 to transmit the next piece of security information. In this way, the car security unit 10 reads sequentially the plural pieces (groups) of security information stored in the memory device 14 on a piece by piece basis, and then transmits it to the remote unit 11, for example, every five seconds. When all pieces of security information are sent, the operation ends.

Upon presenting the first piece of security information on its display 11d, the remote unit 11 returns to step S53, where it waits for the next piece of security information. When the remote unit 11 receives the next piece of security information within a predetermined period of time, control is passed to step S54, where the remote unit 11 presents the received security information using alphanumeric characters on its display 11d. Then, the remote unit 11 returns to step S53. In this way, the remote unit 11 presents the plural pieces of security information sequentially on its display 11d. The remote unit 11 presents all pieces of security information sent from the car security unit 10, and then completes its operation.

FIGS. 15A through 15E show exemplary on-screen security information presented on the display of the remote unit 11. FIGS. 15A through 15E show on-screen indications of a door sensor, a hood/trunk sensor, a radar sensor, an impact sensor, and a glass break sensor, respectively, and when these sensors were triggered.

Because the remote unit 11 presents the security information on its display 11*d* in this embodiment, the user can advantageously learn that an abnormal condition has taken place when the user is located outside or away from the vehicle.

The remote unit 11 of the car security system is allowed to transmit and receive data for a very short period of time (typically 350 ms) in one session in an effort to save power. If the car security unit 10 attempts to transmit many pieces of security information at a time, the remote unit 11 is subject to a reception error because transmission time exceeds a set time limit. In this embodiment, as already described, the reading and transmission of the security information are repeated every five seconds. The operation shown in FIG. 6 permits plural pieces of security information to be transmitted at a time.

Figure 16:
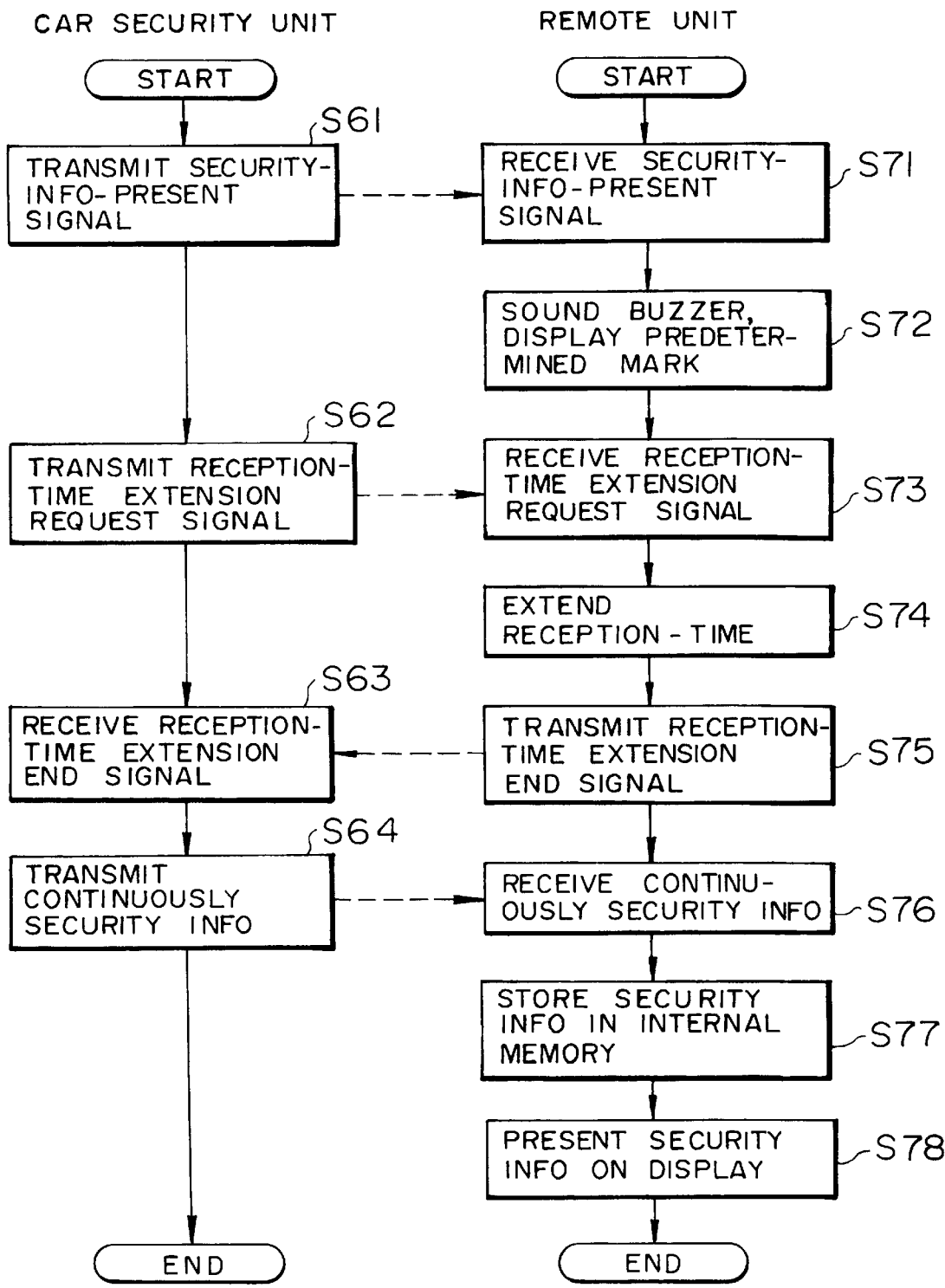
FIG. 16 is a flow diagram showing the operation of a modification of the fifth embodiment.

FIG. 16 is a flow diagram showing the operation of a modification of the fifth embodiment. The controller 17 transmits a "security-information-present" signal to the remote unit 11 when the memory device 14 stores security information (step S61). Upon receiving the security-information-present signal (step S71), the remote unit 11 sounds the built-in buzzer and presents a predetermined mark on the display 11*d* (step S72).

The car security unit 10 passes control from step S61 to step S62, where it transmits a reception-time extension request signal. Upon receiving the reception-time extension request signal (S73), the remote unit 11 modifies reception time to three seconds, for example (step S74). The remote unit 11 then passes control to step S75, where it transmits a reception-time extension end signal.

Upon receiving the reception-time extension end signal (step S63), the car security unit 10 passes control to step S64, where it reads plural pieces of security information stored in the memory device 14, and transmits them in succession. The remote unit 11 receives the transmitted security information and stores them in its internal memory (step S76, step S77). These pieces of security information stored in the internal memory are sequentially read and presented on the display 11*d*, every five seconds, for example.

In this embodiment, by extending reception time of the remote unit 11, plural pieces of security information are transmitted at a time, and wait time in a CPU in the controller 17 in the car security unit 10 is substantially reduced. Since the internal memory in the remote unit 11 stores the security information, the remote unit 11 can display selectively a desired piece of security information rather than simply presenting all pieces of security information sequentially.

The car security unit 10 may transmit the security information to the remote unit 11 only when the user requests the presentation of the security information on the display 11*d* of the remote unit 11.

Sixth Embodiment

A sixth embodiment of the present invention will now be discussed. The sixth embodiment includes a sensor sensitivity adjustment mode in addition to the modes offered by the car security unit 10 in the fourth embodiment. The sixth embodiment will now be discussed referring again to FIGS. 1 through 3.

The sensors that are triggered by an abnormal condition in the vehicle include on-off type sensors such as a door sensor, a bonnet sensor, and a trunk sensor, and sensors requiring sensitivity adjustment, such as an impact sensor and a radar sensor.

Some of radar sensors have two alarm threshold sensitivity levels: one is an exterior alarm threshold level that works as a reference for activating an alarm (a short-duration beep sound) when a person approaches the vehicle in the armed mode, and the other is an interior alarm threshold level that works as a reference for activating an alarm, for example, sounding a siren or flashing lights on and off, when a person intrudes into the vehicle. The two alarm threshold levels are individually adjusted. Also, some impact sensors have two alarm threshold levels: one for generating an alarm when a relatively weak impact is exerted on the vehicle, and the other for generating an alarm when a strong impact is exerted.

Figure 17:
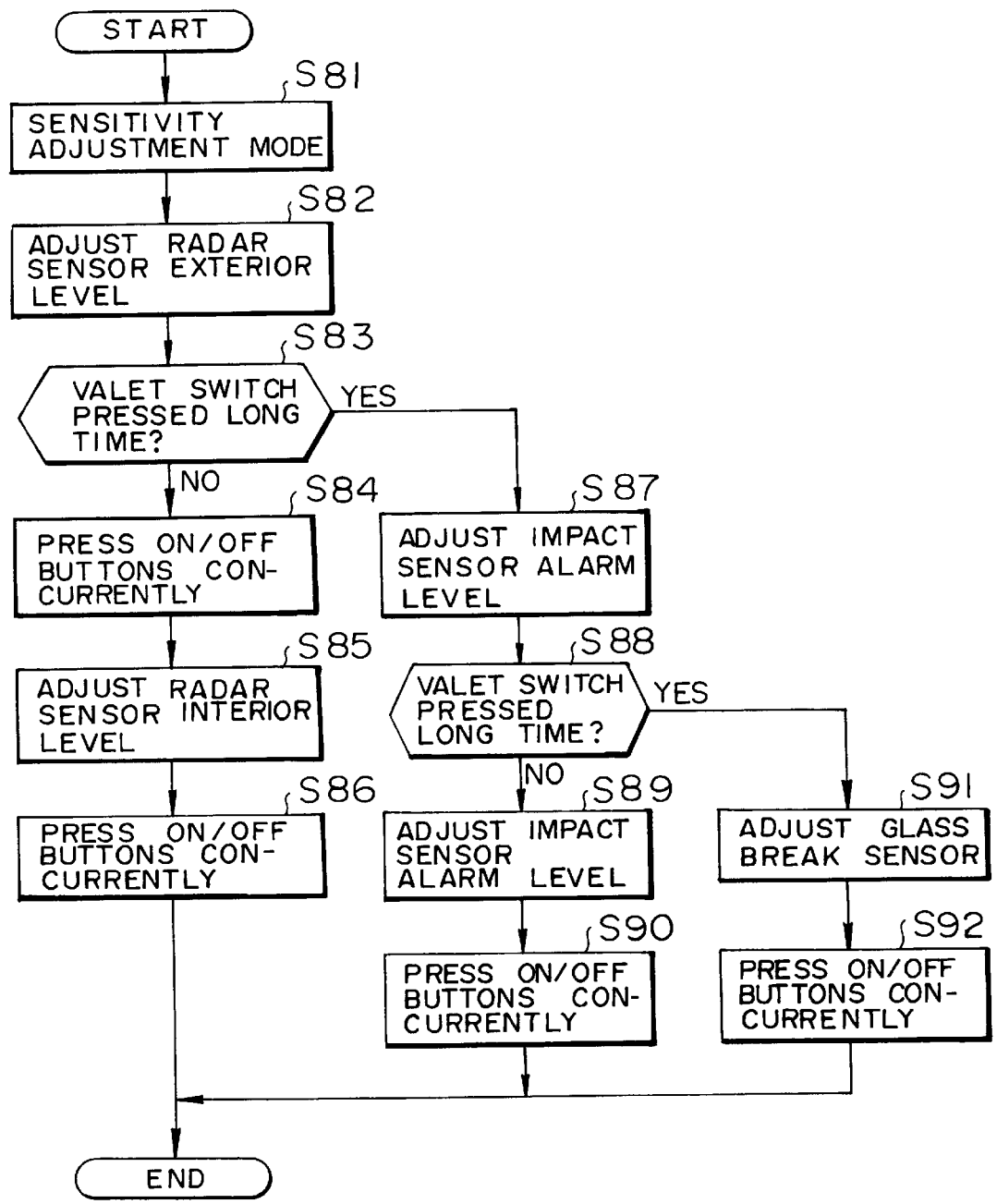
FIG. 17 is a flow diagram showing the operation of a car security system of a sixth embodiment of the present invention.
Figure 19A:
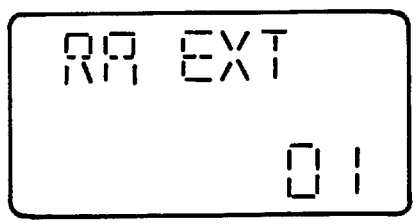
FIGS. 19A through 19E show exemplary screens in the remote unit when sensor sensitivity is adjusted.
Figure 19B:
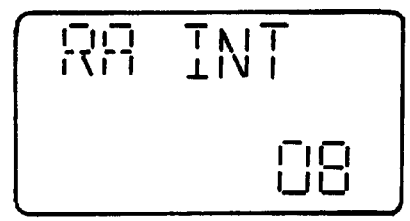
Figure 19C:
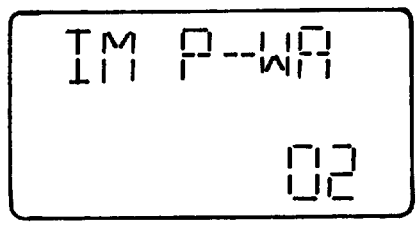
Figure 19D:
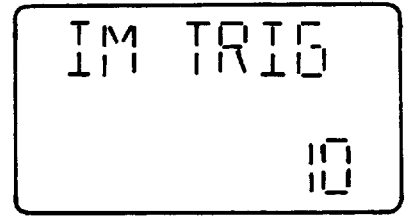
Figure 19E:
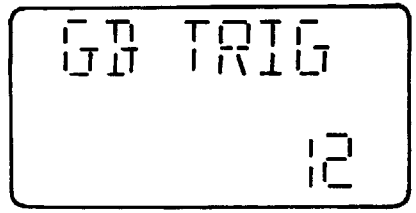

Referring to FIG. 17, the sensitivity of these sensors is adjusted as follows.

When the user presses predetermined buttons (for example, presses concurrently both the security on button and the security off button) on the remote unit 11 while the car security unit 10 is in the valet mode, a predetermined signal is transmitted from the remote unit 11 to the car security unit 10, entering the car security unit 10 into the sensitivity adjustment mode (step S81).

When the car security unit 10 enters the sensitivity adjustment mode, the radar sensor 26 is ready for adjustment in the exterior alarm threshold level (step S82). In this mode, the car security unit 10 transmits data identifying the sensor and a current setting of exterior alarm threshold level of the sensitivity adjuster 26*a* to the head unit 1 via the bus line 6*a*. As shown in FIG. 18A, the head unit 1 presents the name of the sensor (RADAR) and the current threshold level setting (the number ranging from 1 to 20 indicative of a measure of sensitivity, 01 in FIG. 18A, for example) on the display 1*a*.

When the user presses either an UP button or a DOWN button on the remote unit 11, a sensitivity up signal or a sensitivity down signal is respectively transmitted to the car security unit 10. In response to the sensitivity up signal, the car security unit 10 increases sensor sensitivity by one unit by adjusting the exterior alarm threshold level of the sensitivity adjuster 26*a*, and in response to the sensitivity down signal, the car security unit 10 decreases sensor sensitivity by one unit by adjusting the exterior alarm threshold level of the sensitivity adjuster 26*a*. The car security unit 10 transmits the adjusted alarm threshold level value to the head unit 1 via the bus line 6*a*. Upon receiving the value, the head unit 1 updates the sensitivity value presented on the display 1*a*. In this way, the exterior alarm threshold level of the radar sensor 26 is adjusted to its optimum value.

In this state, when the user continuously presses the valet switch 33 for three seconds or more (YES at step S83) in the sensitivity adjustment mode for exterior alarm threshold level of the radar sensor 26, the car security unit 10 transitions to the sensitivity adjustment mode for alarm threshold level for the impact sensor 27 (step S87). When the user presses the predetermined buttons (both the security on button and the security off button concurrently, for example) in the sensitivity adjustment mode for exterior alarm threshold level of the radar sensor 26, the car security unit 10 transitions to the sensitivity adjustment mode for interior alarm threshold level of the radar sensor 26.

In the sensitivity adjustment mode for interior alarm threshold level of the radar sensor 26, the car security unit 10 transmits data identifying the sensor and the current setting of interior alarm threshold level of the sensitivity adjuster 26a to the head unit 1 via the bus line 6a. As shown in FIG. 18B, in response to the data, the head unit 1 presents the name of the sensor (RADAR) and the current alarm threshold level value (08 in FIG. 18B, for example) on the display 1a.

In this state, when the user presses either the UP button or the DOWN button on the remote unit 11, the car security unit 10 adjusts interior alarm threshold level at the sensitivity adjuster 26a and transmits the adjusted value to the head unit 1 via the bus line 6a. Upon receiving the value, the head unit 1 updates the interior alarm threshold level setting value presented on the display 1a.

When the user presses the predetermined buttons (both the security on button and the security off button concurrently), the car security unit 10 terminates the sensitivity adjustment mode and transitions to the drive mode.

In much the same way as above, the adjustment mode for alarm threshold level of the impact sensor 27 is entered at step S87. When the user presses either the UP button or the DOWN button on the remote unit 11, the car security unit 10 changes alarm threshold sensitivity level of the sensitivity adjuster 27a, and transmits the alarm threshold level setting to the head unit 1 via the bus line 6a. Upon receiving the alarm threshold level setting, the head unit 1 presents the name of the current sensor and its sensitivity alarm threshold level setting on the display 1a as shown in FIG. 18C. The user can thus adjust the sensitivity of the impact sensor 27 using the UP button and the DOWN button on the remote unit 11, which also presents the current setting of alarm threshold level of the impact sensor 27.

When the user continuously presses the valet switch 33 for three seconds or more (YES at step S88), for example, in the sensitivity adjustment mode for alarm threshold level of the impact sensor 27, the car security unit 10 transitions to the sensitivity adjustment mode for alarm threshold level of the glass break sensor (step S91). When the user does not continuously press the valet switch 33 for three seconds (No at step S88), for example, in the sensitivity adjustment mode for alarm threshold level for the impact sensor 27, the car security unit 10 transitions to the sensitivity adjustment mode for alarm threshold level of the impact sensor 27 (step S89).

In the sensitivity adjustment mode for alarm threshold level of the impact sensor, the user also can adjust the alarm threshold level using the UP button and the DOWN button on the remote unit 11. The head unit 1 presents the current setting of alarm threshold level of the impact sensor 27 on the display 1a as shown in FIG. 18D.

In much the same way as above, the adjustment mode for alarm threshold level for the glass break sensor 28 at step S91 is performed. The user can adjust the alarm threshold level using the UP button or the DOWN button on the remote unit 11, and the head unit 1 presents the current setting of alarm threshold level of the glass break sensor 28 on the display 1a. When the user presses the predetermined buttons after adjusting the sensitivity of the glass break sensor 28, the car security unit 10 terminates the sensitivity adjustment mode and enters the drive mode.

The sixth embodiment presents the same advantages as the fourth embodiment. Furthermore, according to the sixth embodiment, the user can adjust the sensitivity of the sensors while monitoring the display 1a of the head unit 1, and thus the user is not required to perform verification steps in which the adjustment of each sensor is followed by corresponding actual sensor actuation to make sure that the sensitivity setting is correct. Thus, the sensitivity adjustment process is made substantially more efficient.

In the discussion of the above embodiment, the name of the sensor under adjustment and its level setting are presented on the display 1a of the head unit 1. Alternatively, the name of the sensor under adjustment and its level setting may be presented on the display 11d of the remote unit 11 as shown in FIGS. 19A through 19E. In this case, the car security unit 10 also outputs the setting of alarm threshold level at each of the sensitivity adjusters 26a, 27a and 28a to the remote unit 11 via the transceiver 12 each time the setting is changed, and the remote unit 11 updates accordingly the setting present on the display 11d.

Seventh Embodiment

A seventh embodiment of the present invention will now be discussed. The seventh embodiment includes an ID write mode in addition to the modes featured by the car security unit 10 in the fourth embodiment. The seventh embodiment will now be discussed referring again to FIGS. 1 through 3.

A plurality of users may use a single vehicle equipped with a car security unit 10. In this case, each user holds his or her own remote unit 11. Each remote unit 11 has its unique ID code that may be set during its manufacture. The ID code of each remote unit 11 must be registered in the car security unit 10.

The remote unit 11 transmits its ID code when it transmits control signals to a car security unit 10. The car security unit 10 disregards the received signals if the ID code in the transmitted signals does not match an ID code stored in the memory device 14. The car security unit 10 has an EEPROM in the memory device 14 for storing the ID code therein. The EEPROM can register a plurality of ID codes.

Referring to FIG. 20, a registration method of ID code in the car security unit 10 in this embodiment will now be discussed.

Figures 20A, 20B, 20C, 20D:
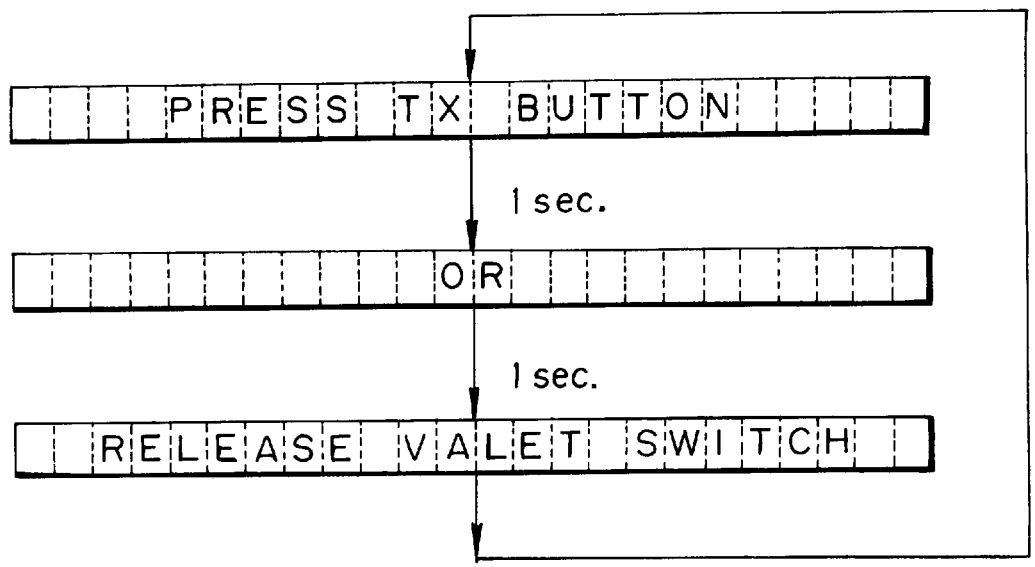
FIGS. 20A through 20D show exemplary screens in the remote unit of a seventh embodiment of the present invention when an ID code is registered.

When the user presses the reset button (not shown) on the car security unit 10 with the ignition switch on and the car security unit 10 in the disarmed mode, the car security unit 10 transitions to an ID code learning mode. The car security unit 10 transmits to the head unit 1 via the bus line a message indicating that the ID code learning mode is entered (for example, "CODE LEARNING MODE ENTERED"). Upon receiving the message, the head unit 1 presents it on the display 1a as shown in FIG. 20A.

After about 1 second following the transmission of the above message, the car security unit 10 transmits to the head unit 1 via the bus line a message (for example, "PRESS TX BUTTON") indicative of a next step of operation to be taken (namely, the transmission of the ID code). Upon receiving the message, the head unit 1 presents it on the display 1a as shown in FIG. 20B.

When the user presses a predetermined button (a TX button in this case) on the remote unit 11 within a predetermined period of time (five seconds, for example) following the entry to the ID code learning mode, the car security unit 10 stores the ID code sent from the remote unit 11 in the EEPROM in the memory device 14. The car security unit 10 transmits a message to the head unit 1 via the bus line indicating that the ID code has been registered (for example, "CODE ACCEPTED"). In response to this message from the car security unit 10, the head unit 1 presents the message on the display 1a as shown in FIG. 20C. When the car security unit 10 receives no ID code within the predetermined time period, it reverts back to the disarmed mode.

The car security unit 10 transmits a message indicative of a next step of operation to be taken (for example, "PRESS TX BUTTON OR RELEASE VALET SWITCH"). In this case, if the message is long, the message is split into three segments, and each segment is sequentially sent one second apart. In response to the received message, the head unit 1 presents the message on the display 1a as shown in FIG. 20D.

To register the ID code of a next remote unit 11, the user presses the TX button on the remote unit 11. In the same way as the first remote unit 11, the head unit 1 presents the message on the display 1a as shown in FIG. 20C. When the user presses the valet switch, the car security unit 10 terminates the ID code learning mode.

The seventh embodiment presents the same advantages as the fourth embodiment. Furthermore, according to the seventh embodiment, the user can register the ID code of each remote unit 11 while monitoring the display 1a of the head unit 1. Thus, the operating efficiency of the system is substantially improved.

According a first aspect of the present invention, as described above, a sensor monitor checks the status of each sensor, a memory stores, as faulty sensor information, information identifying a faulty sensor, and the faulty sensor information is presented on another onboard device that is connected to a car security apparatus via a cable, or is presented on a display of remote unit that performs two-way communications in a cordless fashion. The user can thus easily identify the faulty sensor.

According to another aspect of the present invention, when the ID code in the signal sent from the remote unit matches the ID code stored in the car security apparatus of a selected vehicle, but the vehicle number from the remote unit differs from that set in the car security apparatus, the remote unit presents on its display the vehicle number sent from the car security apparatus. This allows the user to correct the selected vehicle number input even if it is an erroneous one.

According to another aspect of the present invention, information identifying a sensor that has detected an abnormal condition and the time of detection is stored in memory as security information, and the security information stored in memory is output externally via a communication module to a unit having a liquid crystal display. The security information is thus presented on the unit linked to the apparatus via the communication module. The user thus can easily learn details regarding the abnormal condition.

According to another aspect of the present invention, information identifying a sensor that has detected an abnormal condition and the time of detection is stored in memory as security information, the security information is transmitted to an onboard device such as an audio device, an audio visual device and an onboard car navigation device so that the security information is presented on the display of such onboard device. Thus, the user can easily learn details regarding the abnormal condition.

What is claimed is:

1. A car security system mounted on a vehicle, the car security system comprising:
  a car security apparatus for protecting the vehicle from theft and tampering connected to a plurality of sensors, each sensor disposed to detect an abnormal condition of a vehicle, the car security apparatus including means for storing, as faulty sensor information, data identifying a sensor from which faulty operation is detected; and
  an onboard device connected to the car security apparatus via a cable, the onboard device including a display for presenting the faulty sensor information transmitted from the car security apparatus via the cable in the form of alphanumeric characters.

2. A car security system comprising:
  a car security apparatus for Protecting the vehicle from theft and tampering connected to a plurality of sensors, each sensor disposed to detect an abnormal condition of a vehicle, the car security apparatus including means for storing, as faulty sensor information, data identifying a sensor from which faulty operation is detected; and
  a remote control unit for performing two-way data communication via cordless communication with the car security apparatus such that the remote control unit receives the faulty sensor information transmitted from the car security apparatus, the remote control unit including a display for presenting the faulty sensor information in the form of alphanumeric characters.

3. A car security system according to claim 2, wherein the car security apparatus sequentially transmits plural groups of faulty sensor information associated with a plurality of faulty sensors at predetermined regular intervals of time when the plurality of faulty sensors are detected.

4. A car security system comprising:
  a car security apparatus including:
    at least one sensor for detecting an abnormal condition of a vehicle;
    sensor monitoring means for monitoring the status of the sensor;
    alarm generator means for generating an alarm when the sensor detects an abnormal condition in the vehicle, and
    memory means for storing a predetermined ID code and a vehicle ID number, and
    means for transmitting the vehicle ID number; and
  a remote control unit for performing two-way data communication via cordless communication with the car security apparatus such that the remote control unit receives the vehicle ID number transmitted from the car security apparatus, the remote control unit including a display for presenting the received vehicle ID number in the form of alphanumeric characters;
  wherein the car security apparatus transmits the vehicle number to the remote control unit only when an ID code in a signal received from the remote control unit matches the predetermined ID code stored in the memory means.

5. A car security apparatus comprising:
  at least one sensor for detecting an abnormal condition of a vehicle indicative of potential theft of or tampering with the vehicle;
  sensor monitoring means for monitoring the status of the sensor;
  memory means for storing, as security information, data identifying the sensor when the sensor detects an abnormal condition, and data identifying the time of detection when the sensor detects the abnormal condition; and
  communication means for visually communicating the security sensor information stored in the memory means.

6. A car security apparatus according to claim 5, wherein the communication means transmits the security information via a cable.

7. A car security apparatus according to claim 5, wherein the communication means transmits the security information to an audio head unit via a bus line.

8. A car security apparatus according to claim 5, wherein the communication means transmits the security information using a one of a radio wave, a light ray and an acoustic wave.

9. A car security apparatus according to claim 5, wherein the communication means transmits the security information stored in the memory means when an ignition switch in the vehicle is turned on subsequent to changing an operation mode of the car security apparatus from an armed mode to a disarmed mode.

10. A car security apparatus according to claim 8, wherein the communication means transmits a plurality of groups of faulty sensor information stored in the memory means sequentially at predetermined regular intervals when an ignition switch in the vehicle is turned on subsequent to changing an operation mode of the car security apparatus from an armed mode to a disarmed mode.

11. A car security apparatus according to claim 8, wherein the communication means transmits consecutively a plurality of groups of faulty sensor information following the transmission of a signal requesting the extension of reception time when an ignition switch in the vehicle is turned on subsequent to changing an operation mode of the car security apparatus from an armed mode to a disarmed mode.

12. A car security apparatus according to claim 5, wherein the communication means transmits information indicative of the sensitivity of a sensor during the adjustment of the sensitivity of the sensor.

13. A car security apparatus according to claim 5, wherein the communication means transmits the information indicative of a next step of operation to be taken during the registration of an ID code of a remote control unit.

14. A car security system mounted on a vehicle, the car security system comprising:

a car security apparatus for protecting the vehicle from theft and tampering connected to a plurality of sensors, each sensor disposed to detect an abnormal condition of a vehicle, the car security apparatus including means for storing, as security information, data identifying a sensor which has detected an abnormal condition and the time of detection; and an onboard device connected to the car security apparatus via a cable, the onboard device including a display for presenting the security information transmitted from the car security apparatus via the cable in the form of alphanumeric characters.

15. A car security system according to claim 14, wherein the cable is a bus line for transmitting a digital signal.

16. A car security system according to claim 14, wherein the onboard device is an audio head unit.

17. A car security system according to claim 14, wherein the onboard device is an audio visual device having a television monitor display.

18. A car security system according to claim 14, wherein the onboard device is a navigation device having a navigation display.

19. A car security system comprising:

a car security apparatus for protecting the vehicle from theft and tampering connected to a plurality of sensors, each sensor disposed to detect an abnormal condition of a vehicle, the car security apparatus including means for storing, as security information, data identifying a sensor which has detected an abnormal condition and the time of detection; and a remote control unit for performing two-way data communication via cordless communication with the car security apparatus such that the remote control unit receives the security information transmitted from the car security apparatus, the remote control unit including a display for presenting the security information in the form of alphanumeric characters.

* * * * *